Figure 1:
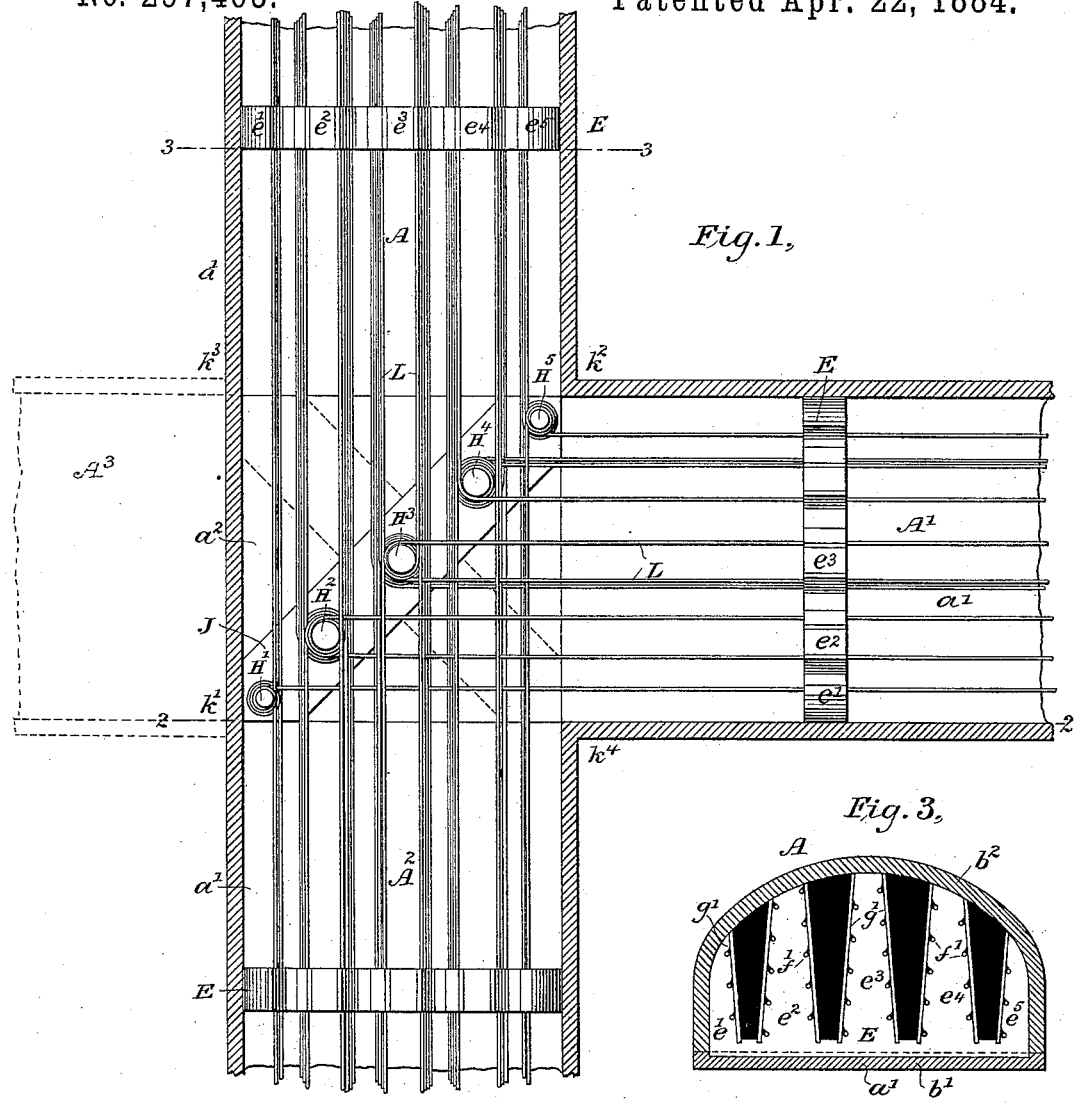

(No Model.)

T. L. SMITH.
CONDUIT FOR UNDERGROUND LINES.

No. 297,463. Patented Apr. 22, 1884.

WITNESSES
Wm. A. Skinkle.
Geo. W. Breck.

INVENTOR
Thomas L. Smith,
By his Attorneys
Pope Edgecomb & Butler

United States Patent Office.

THOMAS L. SMITH, OF NEW YORK, N. Y., ASSIGNOR OF ONE-HALF TO DANIEL A. MATHEWS, OF SAME PLACE.

CONDUIT FOR UNDERGROUND LINES.

SPECIFICATION forming part of Letters Patent No. 297,463, dated April 22, 1884.

Application filed February 4, 1884. (No model.)

*To all whom it may concern:*

Be it known that I, THOMAS L. SMITH, a citizen of the United States, residing in New York, in the county and State of New York, have invented certain new and useful Improvements in Conduits for Underground Lines, of which the following is a specification.

My invention relates to the class of conduits employed for supporting and inclosing electric conductors beneath the earth.

The invention has for its object, generally, to provide means for laying such conductors in a convenient manner, supporting them in such a manner that ready access may be had thereto for the purpose of preparing them or securing electrical connections therewith, and especially to provide means for leading the conductors around corners and extending them from one conduit to another without occasioning any material change in the relative positions of the several conductors.

The invention is especially adapted to and designed to be employed in connection with an underground system wherein the conductors are supported within a suitable conduit preferably composed of alternating short and long sections, by means of bridges placed in the longer sections, and constructed with upwardly-projecting arms or fingers, along the sides of which are formed notches for receiving the several conductors. The sides of these arms or fingers preferably incline slightly in one direction or the other, and thus the conductors, when in position, lie in different vertical planes. It is evident that a series of conductors thus supported will be liable to be brought into contact with each other to some extent when the directions of some or all of them are changed—as, for instance, when they are turned about sharp angles—unless some special means are provided for supporting them at such points.

My invention consists in placing at the corners which are to be turned a series of pillars extending diagonally across one of the conduits or along the line of union of two or more of the conduits. These pillars are preferably in the form of truncated cones, tapering from their bases toward their upper extremities, and they are provided with spiral grooves or corrugations in the form of screw-threads, for the purpose of more securely holding the wires in position. The conductors, as they are led from the supporting-bridges, are turned about a corresponding pillar, in one direction or the other, accordingly as they are led from one side or the other of the corresponding finger or arm of the bridge. They are, moreover, held in the same vertical positions upon the pillars as they occupy when supported in the notches upon the bridges. Having been thus turned about the pillars, they may be independently led into a conduit extending at any desired angle from the conduit from which they proceed, and certain of the conductors may at the same time be continued along the same conduit, their direction being unchanged.

Figure 3:
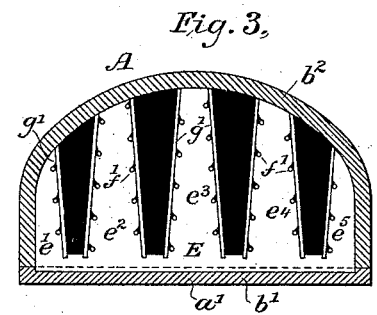
Figure 2:
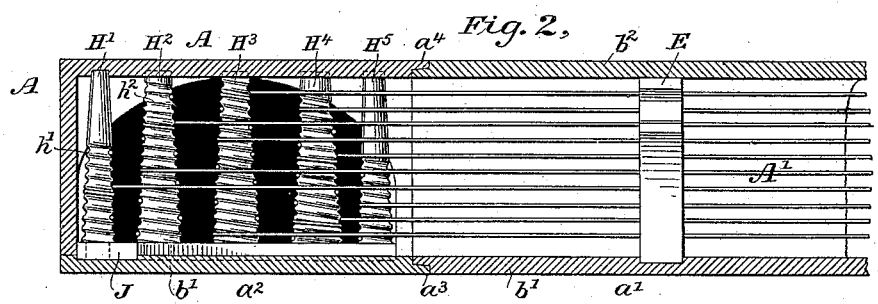

In the accompanying drawings, Figure 1 is a plan view of a conduit embodying the features of this invention, and Fig. 2 is a transverse section of the same. Fig. 3 is a detached view, showing the construction of the supporting-bridges.

Referring to these figures, A represents the main conduit, which is preferably of clay or cement or other suitable non-conducting material, and which is preferably composed of two classes of sections, $a'$ and $a^2$. The sections $a'$ are of considerably greater length than the sections $a^2$, and form the main portion of the conduit. One of the shorter sections, $a^2$, preferably intervenes between the adjacent ends of every two of the longer sections, $a'$. All of the sections of the conduit are preferably constructed in two parts—a flat portion, $b'$, which forms the base of the conduit, upon and over which fits a curved cover or top, $b^2$. The ends of the bottom portions, $b'$, of the longer sections, $a'$, preferably overlap the corresponding portions of the short sections, $a^2$, as shown at $a^3$. The upper curved portions, $b^2$, of the short sections, $a^2$, however, overlap the ends of the longer sections, $a'$, as shown at $a^4$. By reason of this construction I am enabled to lay the bottom of both sections, $a'$ and $a^2$, and the upper portions or covers, $b^2$, of the longer sections, $a'$, before finally putting the covers $b^2$ of the sections $a^2$ in place. This method of construction greatly facilitates the operation of laying the conductors.

At suitable points within the sections $a'$ are placed bridges E. One of these bridges is preferably placed at about the central point of each of the longer sections, $a'$, and they are preferably constructed of earthenware or other suitable non-conducting material. Each of these bridges consists of a series of vertical fingers or arms, $e'$ $e^2$, &c. The sides of each of these fingers converge toward its upper extremity, so that the notches or grooves $f'$, formed in their sides for supporting conductors, do not fall in the same vertical planes. The notches $f'$ are placed at any suitable distances apart, and in number they are as great as the number of conductors which it may be desired to place in the conduit. The conductors, when they are laid in the conduit, are supported by these notches; and for the purpose of preventing them from being accidentally displaced suitable non-conducting plates, $g'$, may be secured against the sides of the fingers, thereby closing the grooves or notches $f'$.

When it is desired to lead a second or branch conduit from the main conduit, or to cause the main conduit to turn a corner, as illustrated at $A'$, a series of pillars in number corresponding to the number of fingers $e$, with which each of the bridges E is provided, is placed at the intersecting line of the two conduits or sections of conduit, as shown at $H'$ $H^2$, &c. These pillars are securely supported at the bottom of the conduit, preferably by being mounted upon a support, J, adapted to be fitted in the base $b'$ of the conduit. If desired, the upper extremities of the pillars H may be fitted into corresponding apertures formed in the cover $b^2$. The pillars are preferably made of the same material as the conduit, or they may be made of sheet metal with a covering of cement or earthenware of suitable thickness, and glazed. They preferably taper toward their upper extremities, as shown in the drawings, and they are provided with spiral grooves, corrugations, or screw-threads $h'$, which have sufficient size and depth to afford the conductors a secure support. These pillars are respectively located at the points where lines extending from the corresponding fingers, $e$, of the bridges E in the intersecting conduits meet each other. Thus the pillar H' is placed in such a position that the conductors extending from the finger $e'$ of the bridge of the last bridge E in the section or conduit A will touch the pillar, and upon being turned around the same they will be in the direct line with the corresponding finger, $e'$, of the first bridge E in the section of conduit $A'$. Likewise the pillars $H^2$, $H^3$, and $H^4$ are made to correspond in position to the fingers $e^2$, $e^3$, and $e^4$ of the respective bridges.

In laying the conductors, it is desirable to lead those which are supported upon the right-hand sides of the fingers $e$ to the right-hand sides of the pillars H and turn them about the same toward the right hand, or in the direction of the movement of the hands of a watch, and to lead the conductors which are upon the left-hand sides of the fingers to the left-hand sides of the pillars, and to turn them about the same in the opposite direction. The conductors may be simply turned half round the pillars, or, if desired, may be wrapped around the same once or more times. The conductors in this manner receive an independent support by means of the pillars H, and it is evident that they may be led in one direction or another, as desired, from the pillars, which, being tapering and of circular cross-section, and in diameter approximately equal to the width of the fingers $e$, will maintain the conductors at the same distance apart as the fingers of the bridges, while the screw-threads securely hold them in their relative vertical positions.

It is evident that the conductors leading from the different sides of the bridge-fingers should be in different horizontal planes, so that they may not conflict with each other upon the pillars. For this purpose the notches $f'$, upon the opposite sides of the fingers of the bridges, are preferably in different horizontal planes.

In the drawings I have represented certain of the conductors L coming from the conduit A as being led from the pillars toward the right hand into the conduit $A'$, and others as extending straight forward into the continuation $A^2$ of the conduit A. It will be observed, however, that in the construction illustrated the series of pillars H being arranged diagonally from the point $h'$ to the point $h^2$, those of the conductors which are led into the section $A'$ will preserve their same relative positions. If, however, it were desired to lead certain of the conductors into a conduit, $A^3$, at the left hand, as shown in dotted lines, the positions of such conductors would be reversed, the conductors from the left-hand side of the section A being then upon the right-hand side of the conduit $A^3$. If, however, for any reason it is desired to maintain the conductors in precisely the same relative positions, a second series of pillars may be extended from the point $h^3$ to the point $h^4$, as indicated in dotted lines, for the purpose of serving the requirements of the conductors which are to be laid into the section $A^3$.

I claim as my invention—

1. The combination, substantially as hereinbefore set forth, of a series of supporting-bridges for electric conductors, having a series of upwardly-projecting fingers, in the sides of which are formed notches for receiving the conductors, non-conducting plates covering said notches, and a series of tapering pillars for receiving the conductors led from said fingers, and extending diagonally across the conduit containing said bridges.

2. In an underground conduit, the combination, substantially as hereinbefore set forth, of a bridge consisting of a series of upwardly-projecting fingers for supporting electric conductors, and a series of pillars corresponding in number to the number of said fingers.

3. The combination, substantially as hereinbefore set forth, in a conduit for electric conductors, of means, substantially such as described, for supporting conductors throughout the length of said conduit, and a series of conical pillars placed at the corners formed in said conduit, or by branch sections of said conduit.

4. The combination, substantially as hereinbefore set forth, with a series of electric conductors, and means, substantially such as described, for supporting the same in different vertical planes within an underground conduit, of a series of conical tapering pillars placed at the points where said conductors deviate from straight lines, for supporting said conductors in such a manner that they may be led in different directions, said pillars having spiral grooves, substantially as described.

5. The combination, substantially as hereinbefore set forth, with a series of electric conductors, of means, substantially such as described, for supporting the same in different vertical and horizontal planes within an underground conduit, and a series of pillars placed at the points where said conductors deviate from straight lines, for supporting said conductors in such a manner that they may be led in different directions, said pillars having spiral corrugations or grooves, substantially as described.

6. In a conduit for underground lines, a series of tapering grooved pillars extending along the line of intersection of two or more sections of conduit, substantially as described.

7. The combination, substantially as hereinbefore set forth, with the conduits A and A', and the bridges E, of the pillars H, having the spiral grooves $b$.

8. The combination, substantially as hereinbefore set forth, in a conduit for underground lines, of a series of tapering grooved pillars arranged diagonally across said conduit, and supported at the top and bottom in the outer walls of said conduit, substantially as described.

In testimony whereof I have hereunto subscribed my name this 31st day of January, A. D. 1884.

THOMAS L. SMITH.

Witnesses:
 DANL. W. EDGECOMB,
 CHARLES A. TERRY.